(12) United States Patent
Bonavides et al.

(10) Patent No.: US 9,158,014 B2
(45) Date of Patent: Oct. 13, 2015

(54) ACOUSTIC SOURCE APPARATUS, SYSTEMS, AND METHODS

(75) Inventors: Clovis Bonavides, Houston, TX (US); Batakrishna Mandal, Missouri City, TX (US); Arthur Cheng, Houston, TX (US); Wei Zhang, Houston, TX (US); Philip William Tracadas, West University Place, TX (US); Gary Kainer, Tomball, TX (US); Hong Li Hou, Cypress, TX (US); Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/386,671

(22) PCT Filed: Apr. 9, 2012

(86) PCT No.: PCT/US2012/032713
§ 371 (c)(1),
(2), (4) Date: Sep. 19, 2014

(87) PCT Pub. No.: WO2013/154520
PCT Pub. Date: Oct. 17, 2013

(65) Prior Publication Data
US 2015/0083518 A1    Mar. 26, 2015

(51) Int. Cl.
*G01V 1/40* (2006.01)
*G01V 1/143* (2006.01)

(52) U.S. Cl.
CPC ........ *G01V 1/143* (2013.01); *G01V 2210/1299* (2013.01)

(58) Field of Classification Search
CPC .......................................... G01V 1/52
USPC .................................................. 181/106, 108
See application file for complete search history.

(56) References Cited

U.S. PATENT DOCUMENTS 2,825,230 A * 3/1958 Walker .............................. 74/87
2,901,685 A    8/1959 Alder
(Continued)

FOREIGN PATENT DOCUMENTS

WO    WO-2008/076110 A1    6/2008
WO    WO-2013154520 A1    10/2013

OTHER PUBLICATIONS

"International Application Serial No. PCT/US2012/032713, International Search Report mailed Jul. 5, 2012", 4 pgs.
(Continued)

*Primary Examiner* — Forrest M Phillips
(74) *Attorney, Agent, or Firm* — Schwegman Lundberg & Woessner, P.A.; Benjamin Fite (57) ABSTRACT

In some embodiments, an apparatus and a system, as well as a method and an article, may operate to rotate a rotatable driving member having at least one driving lobe, and to periodically contact at least one cam on a unitary driven member with the at least one driving lobe during rotation of the rotatable driving member, to set the driven member in motion. This motion can be used to launch an acoustic wave along an axis substantially orthogonal to the axis of rotation of the driving member, where the driving member disposed completely within the driven member. The signature of the acoustic wave can be at least partially determined by the profile of the cam and the rotation rate of the driving member. Additional apparatus, systems, and methods are disclosed.

27 Claims, 9 Drawing Sheets

(56) References Cited

U.S. PATENT DOCUMENTS

| | | | |
|---|---|---|---|
| 4,514,834 A | 4/1985 | Hanson et al. | |
| 4,984,652 A * | 1/1991 | Batzle et al. | 181/104 |
| 5,646,380 A | 7/1997 | Vaage | |
| 6,085,862 A | 7/2000 | Tenghamn | |
| 7,182,170 B1 * | 2/2007 | Brett et al. | 181/121 |
| 7,213,681 B2 | 5/2007 | Birchak et al. | |
| 7,633,835 B1 | 12/2009 | Erikson et al. | |

OTHER PUBLICATIONS

"International Application Serial No. PCT/US2012/032713, Written Opinion mailed Jul. 5, 2012", 8 pgs.

"European Application Serial No. 12874096.6, Extended European Search Report mailed Apr. 7, 2015", 4 pgs.

"International Application Serial No. PCT/US2012/032713, International Preliminary Report on Patentability mailed Oct. 23, 2014", 5 pgs.

\* cited by examiner

ACOUSTIC SOURCE APPARATUS, SYSTEMS, AND METHODS

CLAIM OF PRIORITY

This application is a U.S. National Stage Filing under 35 U.S.C. §371 of International Application PCT/US2012/032713, filed on 9 Apr. 2012, and published as WO 2013/154520 A1, which application and publication are hereby incorporated by reference herein in their entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, acoustic sources in sonic tools are sometimes used to determine the interaction between sonic waves and sub-surface formations.

Presently available sonic tools have a limited ability to generate strong low frequency flexural waves in formations. When conventional piezoelectric and electromagnetic sources are used, large amounts of power are typically required to generate significant acoustic energy. In addition, the fabrication of acoustic wave generation elements (e.g., piezoelectric crystals) that operate to produce a well-matched dipole source is difficult.

DETAILED DESCRIPTION

To address some of the challenges described above, as well as others, apparatus, systems, and methods make use of an acoustic source driven by a mechanical system (e.g., a motor and transmission) to provide multi-polar acoustic emissions that are well-suited to borehole environment operations. The mechanical drive system may be so that acoustic energy output can be tailored to consistently produce strong flexural waves in a borehole.

In many embodiments, a mechanical cam is driven by the driving lobe on a rotating shaft to move a driven member (e.g., a piston), producing a repetitive acoustic pulse. The shaft's rotational speed may be controlled arbitrarily. The signature of the acoustic pulse is controlled by the cam surface shape and the shaft speed profile. That is, in some embodiments, the cam shape and speed profile of the motor driving the shaft influence the amplitude and the spectral content of the acoustic wave generated by piston movement. In some embodiments, the motor angular speed modulates the waveform determined by the cam profile compressing (when motor speed is increased) or expanding (when motor speed is decreased) the cam-dictated acoustic signature of the piston in the time domain. Multiple driving lobes, multiple cams, and varying profiles of contact surfaces may be used.

Similarly, other variations may be implemented. For example, the drive shaft speed may be controlled arbitrarily as a function of the angle of rotation or in some other fashion (e.g., shaft speed may depend on multiple variables), according to the particular design that is actually used. Various example embodiments, some of which provide significant advantages over conventional acoustic sources, will now be described in detail.

Figure 1A:
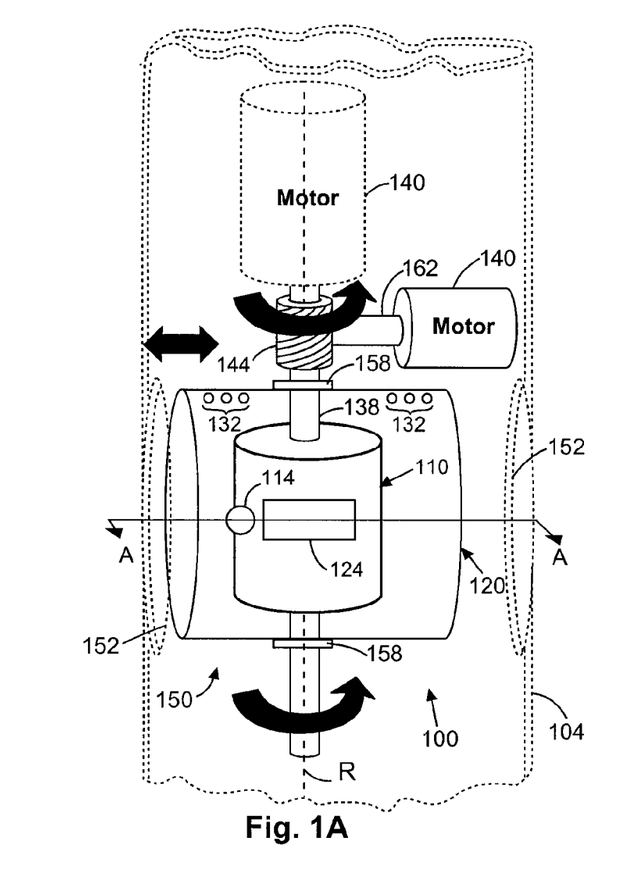
FIGS. 1A-1B illustrate schematic and section views, respectively, of a single dipole source apparatus according to various embodiments of the invention.
Figure 1B:
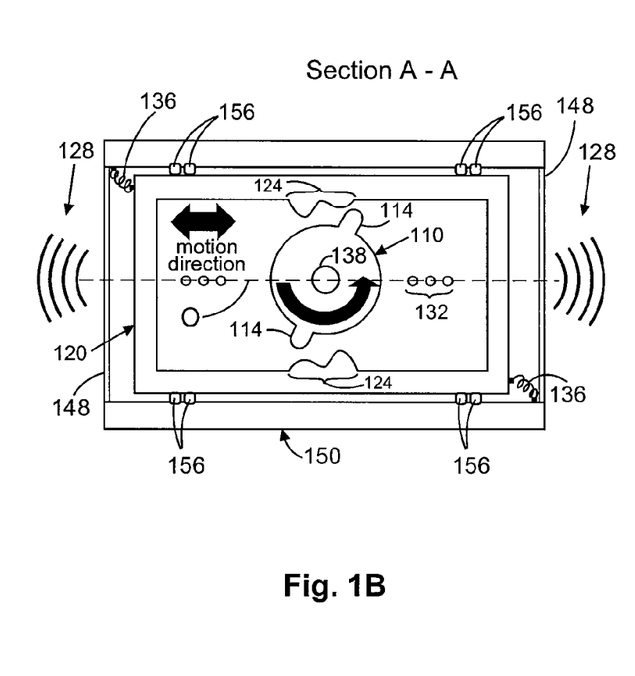

FIGS. 1A-1B illustrate schematic and section views, respectively, of a single dipole source apparatus 100 according to various embodiments of the invention. In many embodiments, the apparatus 100 comprises a rotatable driving member 110 having at least one driving lobe 114. The apparatus 100 may also comprise a unitary driven member 120 having at least one cam 124. The driving member 110 is at least partially disposed within the driven member 120. In some embodiments, the driving member 110 is completely disposed within the driven member 120 (shown in FIG. 1). The driven member 120 is configured to be set in motion to launch a dipole acoustic wave 128 along an axis O substantially orthogonal to an axis of rotation R of the driving member 110 when the driving member 110 rotates to periodically contact the cam(s) 124 with the driving lobe(s) 114.

The acoustic wave 128 has a signature determined by the profile of the cam(s) 124 and the rotation rate of the driving member 110. A mirrored face configuration on the cams 124, with dual driving lobes 114, can be used to give more precise control over the signature of the acoustic waves 128.

In some embodiments, different driving lobes 114 have different shapes. In some embodiments, different cams 124 have different shapes. When this occurs, the interaction between the lobe 114 and cam 124 on one side of the driven element produces an acoustic wave 128 with a different frequency profile than interaction between the lobe 114 and cam 124 on the other side of the driven element, as part of a single revolution of the driven member 120.

In the apparatus 100 of FIG. 1, the driven member 120, depicted in the form of a horizontal can, is separated from a tool body 104. The driven member 120 moves in a horizontal direction (along the axis O), orthogonal to the longitudinal axis of the tool, which in this instance coincides with the axis of rotation R. A containment body 150 can be used to contain the driven member 120 as it moves back and forth.

Various elements can be used to form the apparatus 100. For example, the movement of the driven member 120 can be restricted and/or restored using one or more restoration devices 136 (e.g., return springs or bumpers). In some embodiments the restoration devices 136 may include one or more assemblies encompassing spring(s) and damping element(s) which in association with the mass of the containment body 150 can further aid a designer to model the system response to achieve a desired pattern during the time when the lobe 114 is not touching the surface of the cam 124. The use of restoration devices 136 can also help reduce the presence of unwanted wave propagation modes that might result from possible interactions between the driven member 120 and the tool body 104. The movement of the driven member 120 can also be isolated from the tool body 104 using motion guides 156 (e.g., O-ring gliders) to slideably couple the driven member 120 to the containment body 150. One or more motors 140 can be used to drive the driving member 110, perhaps via a transmission 144. The motor 140 can be turned on/off, or have its speed varied as desired to influence the signature of the acoustic wave 128.

In many embodiments, the displacement of the driven member 120 depends on the shape of the driving lobe 114 and/or the shape of the cam 124. The resulting ability to control displacement using a mechanical interface lends itself to creating relatively pure, matched monopole sources.

The outer surfaces of the apparatus 100 may comprise a membrane 148 which interfaces with a borehole acoustic conduction medium (e.g., drilling mud and/or formation fluid). The membrane 148 may be clamped to the tool body 104 in some embodiments. The driving motor 140, the driven member 120, and/or the membranes 148 may be compensated for hydrostatic pressure by filling the containment body 150 with oil or some other fluid. In some embodiments (not shown in FIG. 1), the driven member 120 may be placed directly in contact with the acoustic conduction medium, such as wellbore fluid.

Bearing seals 158 may be used to allow the shaft 138 to rotate against the containment body 150 that houses the driven member 120. Orifices 132 may be formed in the wall of the driven member 120 to equalize pressure in some embodiments.

With the mounting arrangement shown, when the driven member 120 is displaced in a first direction along the axis O, pressure within the containment body 150 in that direction increases as the unoccupied volume decreases. At about the same time, the pressure in the opposite direction within the body 150 decreases, as a result of increased unoccupied volume on the opposing side. The result is a dipole acoustic source that creates acoustic waves 128, which operate to induce flexural waves in a surrounding formation.

In some embodiments, the driven element 120 and the motion guides 156 (e.g., restriction gliders) can be rotated about the axis of rotation R to fixed angles relative to the tool body 104 so the dipole direction of the wave 128 may be aimed in selected directions. In some embodiments, the tool body 104, or cutouts 152 in the tool body 104, may be rotated to match the direction in which the dipole radiation is strongest, so as to excite the surrounding formation more strongly.

The connection between the motor 140 and the driving element 110 is not limited to a rigid shaft 138. For example, the motor 140 and driving element 110 can be coupled by an intermittent drive mechanism, such as a transmission 144 (e.g., a gearbox or a Geneva drive) to reduce drive requirements. One or more motors 140 can be mounted to drive the shaft 138 directly (shown using dashed lines), or indirectly, using a drive shaft 162 that is not substantially parallel to the shaft 138.

Figure 2A:
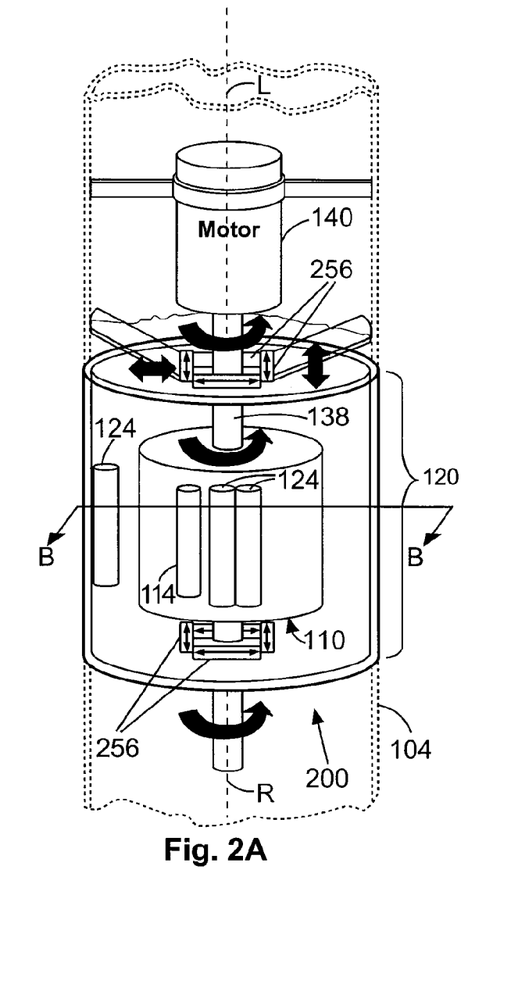
FIGS. 2A-2B illustrate schematic and section views, respectively, of a crossed dipole source apparatus according to various embodiments of the invention.
Figure 2B:
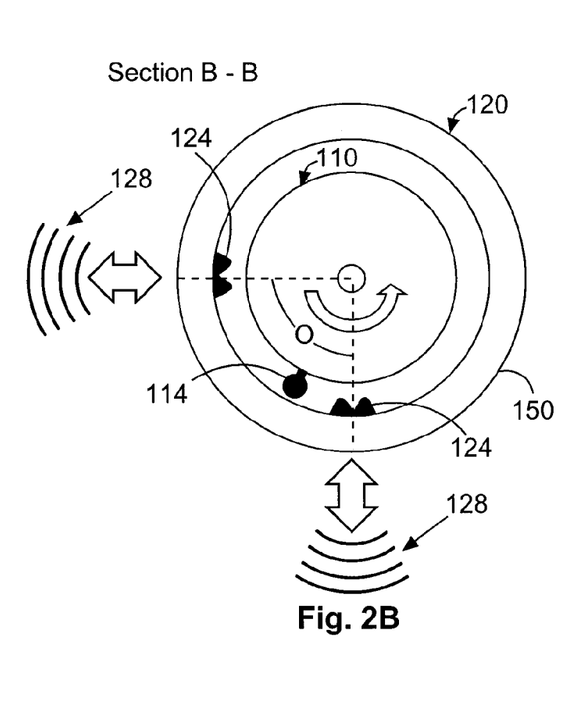

FIGS. 2A-2B illustrate schematic and section views, respectively, of a crossed dipole source apparatus 200 according to various embodiments of the invention. In this case, the driving element 110 is arranged in a similar manner to that shown in FIG. 1, however the driven element 120 in this case comprises a portion of the tool body 104—moving in the azimuthal direction when the driving lobe 114 strikes the cam 124, orthogonal to the longitudinal axis of the tool body 104 (which coincides here with the axis of rotation R, although this arrangement is not necessary). The figure shows the dipole sources (comprising the driving element 110, the driven element 120, and the driving lobe(s) 114 interacting with the cam(s) 124) co-located at substantially the same elevation on the tool body 104. In this way, the driven member 120 moves along two mutually orthogonal axes, defined by pairs of motion guides 256 (e.g., slides or pillow blocks), which are each orthogonal to the axis of rotation R in this example embodiment. The motion guides 256 may thus take the form of paired tracks, which may be suspended using ball bearings or wheeled gliders to slideably couple the driven member 120 to the containment body 150 (which here forms a part of the tool body 104). In this embodiment, if the shaft 138 is driven at approximately one rotation per second, the initial pulse of the waves 128 generated by the two dipole sources will be separated by approximately 250 milliseconds, within a range of about 50 milliseconds to about 500 milliseconds, which can be useful during formation logging operations. Abrupt changes in the profile of the cam 124 can result in rapid movement of the driven member 120, producing acoustic waves 128 with a wide range of frequencies. The system involving the motor 140, the driving element 110, the profile of the driving lobe 114, the shape of the driven element 120, the profile of the cam 124, and the pertaining accessories can be designed to produce an acoustic wavefront with a desired spatial distribution, amplitude, and spectral content.

Figure 3:
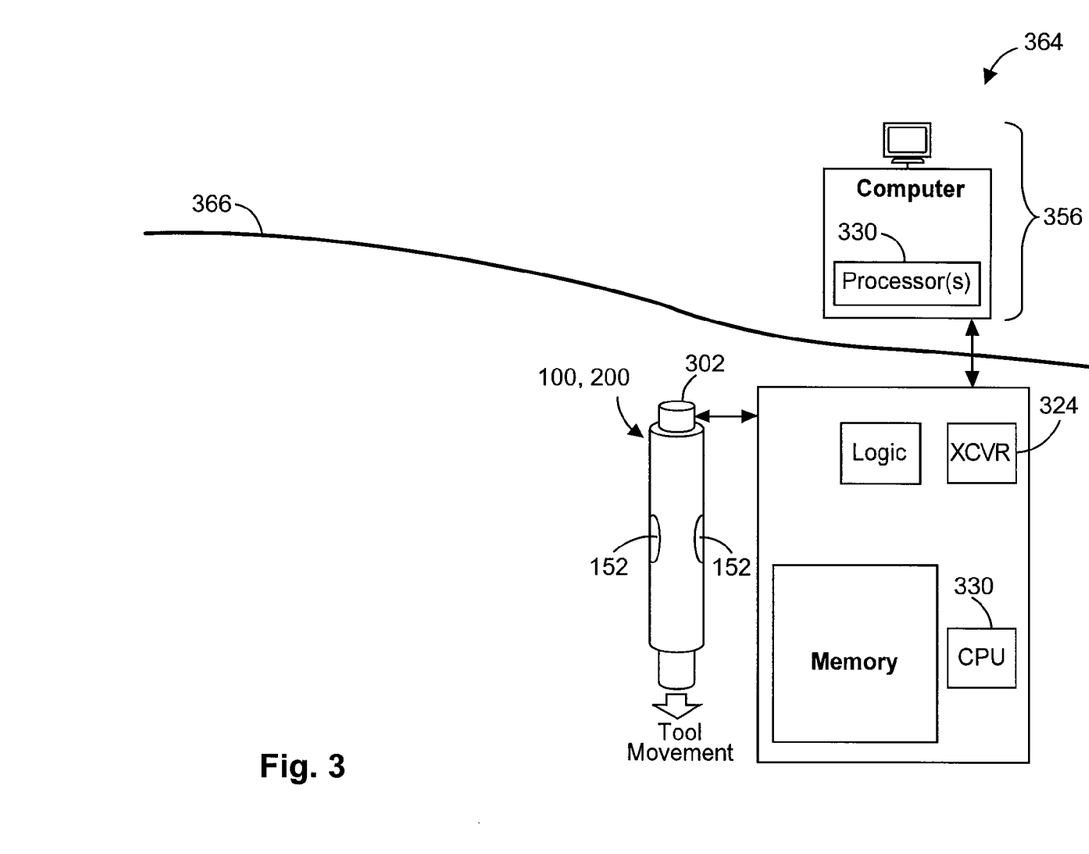
FIG. 3 is a block diagram of an apparatus and system according to various embodiments of the invention.

FIG. 3 is a block diagram of an apparatus 100, 200 and system 364 according to various embodiments of the invention. In some embodiments, a system 364 comprises one or more of the apparatus 100, 200 as well as a housing 302. The housing 302 might take the form of a wireline tool body, or a down hole tool. The system 364 may comprise one or more processors 330, which may accompany the apparatus 100, 200 (e.g., perhaps attached to the housing 302, and used to control the motion of the apparatus 100, 200) down hole. In some embodiments, the processors 330 are located remotely from the apparatus 100, 200.

A data transceiver may be used to transmit acquired data values and/or processing results to the surface 366, and to receive commands (e.g., apparatus 100, 200 motion control commands) from processors 330 on the surface 366. Thus, the system 364 may comprise the data transceiver 324 (e.g., a telemetry transceiver) to transmit/receive data/command values to/from a surface workstation 356.

Therefore, referring now to FIGS. 1-3, many embodiments may be realized. For example, in some embodiments, the apparatus 100, 200 comprises a rotatable driving member 110 having at least one driving lobe 114, and a unitary (i.e., single piece) driven member 120 having at least one cam 124.

The driving member 110 may be disposed completely within the driven member 120. The driven member 120 may be configured to be set in motion to launch acoustic waves 128 along an axis O substantially orthogonal to an axis of rotation R of the driving member 110 when the driving member 110 rotates to periodically contact the at least one cam 124 with the at least one driving lobe 114. The acoustic wave 128 may have a signature determined by the profile of the cam 124 and the rotation rate of the driving member 110. As used herein, the phrase "periodically contact" means non-continuous contact on a more or less repeating basis.

In some embodiments, the driven member may be oriented to move orthogonally to the driving member's axis of rotation R. Thus, the driven member 120 may be constrained to move along an axis O substantially perpendicular to the axis of rotation R of the driving member 110.

In some embodiments, the driven member may comprise a fluid-filled body with holes to equalize pressure. Thus, the driven member 120 may comprise a fluid-filled, substantially closed body with at least one pressure-equalizing orifice 132.

In some embodiments, the driven member may have two opposing cams that impart reciprocating motion to the driven member when the driving member rotates. Thus, the driven member 120, when set in motion, may comprise a reciprocating body having two substantially opposing cams 124.

In some embodiments, one or more restoration devices can be used to constrain and/or restore the motion/location of the driven member. Thus, the driven member 120 may be coupled to at least one restoration device 136 to limit the travel distance of the driven member 120, and to return the driven member 120 to a rest position.

In some embodiments, the driving member and the driven member may each comprise substantially cylindrical bodies. Thus, the driven member 120 may comprise a first substantially cylindrical body, and the rotatable driving member 110 may comprise a second substantially cylindrical body. The first and second substantially cylindrical bodies may be disposed so that their longitudinal axes are approximately orthogonal to each other (e.g., the axes R and O, as shown in FIG. 1A). In some embodiments, the first and second substantially cylindrical bodies are disposed so that their longitudinal axes are substantially coaxial along the same longitudinal axis (e.g., the axis R in FIG. 2A).

In some embodiments, the apparatus may include a motor to rotate the driving member. Thus, the apparatus 100, 200 may comprise a motor 140 having a shaft 138 coupled to the driving member 110, where the shaft 138 lies substantially parallel to the axis of rotation R of the driving member 110.

In some embodiments, the driving lobe and cam may comprise a pair of lobes and cams with mirrored profiles that cooperate to control the excursions of the driven member, and thus, the characteristics of the acoustic waveform. The phrase "mirrored profile" as used herein means an element (e.g., a first cam) having a profile that advances when the profile of its mirrored twin (e.g., a second cam attached to an opposing side of a driven member 120) recedes, and that recedes in turn when the profile of its mirrored twin advances. Thus, the apparatus 100, 200 may comprise a pair of driving lobes 114, and a pair of cams 124, the driving lobes 114 having a first pair of mirrored profiles, and the pair of cams 124 having a second pair of mirrored profiles.

In some embodiments, the apparatus may include a transmission, with a fixed ratio, or a variable ratio, that may in turn be continuously variable, or selectably variable in a series of steps. Thus, the apparatus 100, 200 may comprise a transmission 144 to couple a motor 140 to a driving member 110.

In some embodiments, the motor used to rotate the driving member may be coupled to the driving member along a path that does not parallel the axis of rotation. Thus, the apparatus 100, 200 may comprise a motor 140 having a shaft 162 coupled to the driving member 110, the shaft 162 being non-parallel to the axis of rotation R of the driving member 110.

Figure 4:
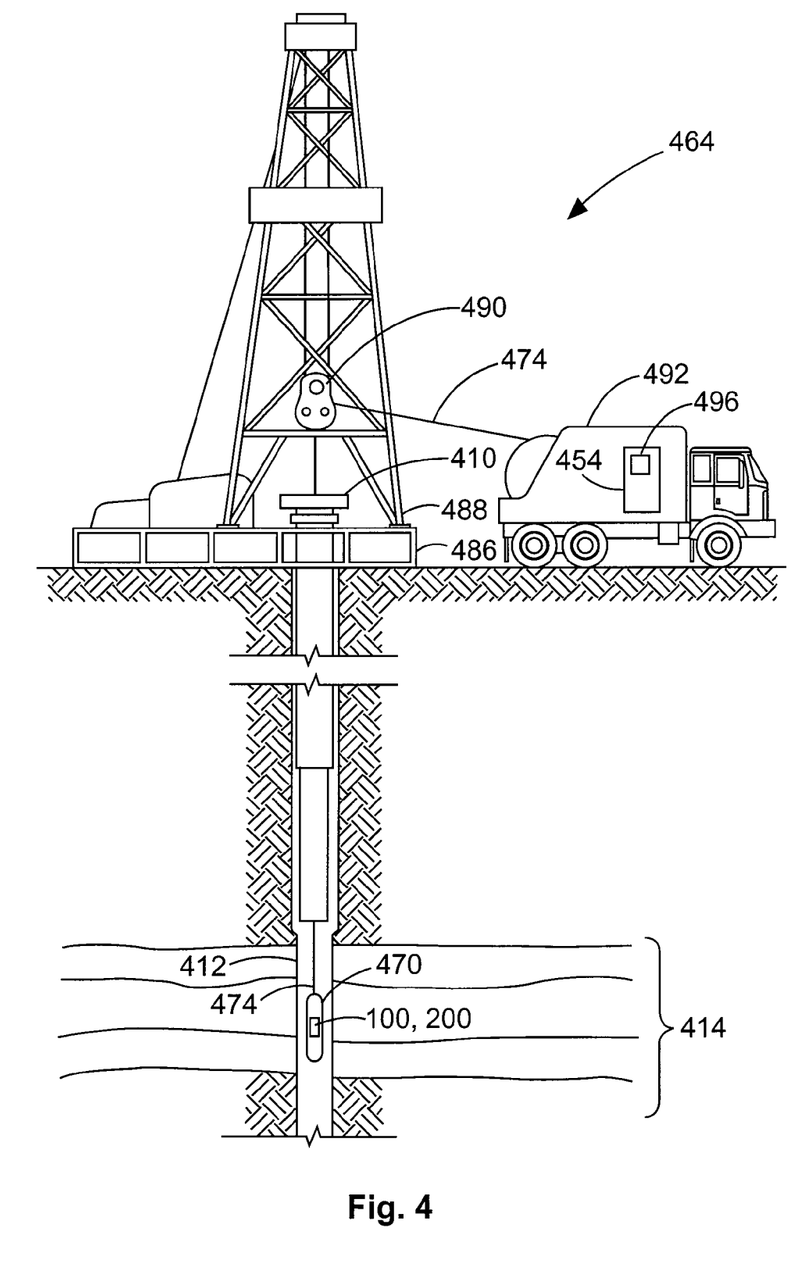
FIG. 4 illustrates a wireline system embodiment of the invention.
Figure 5:
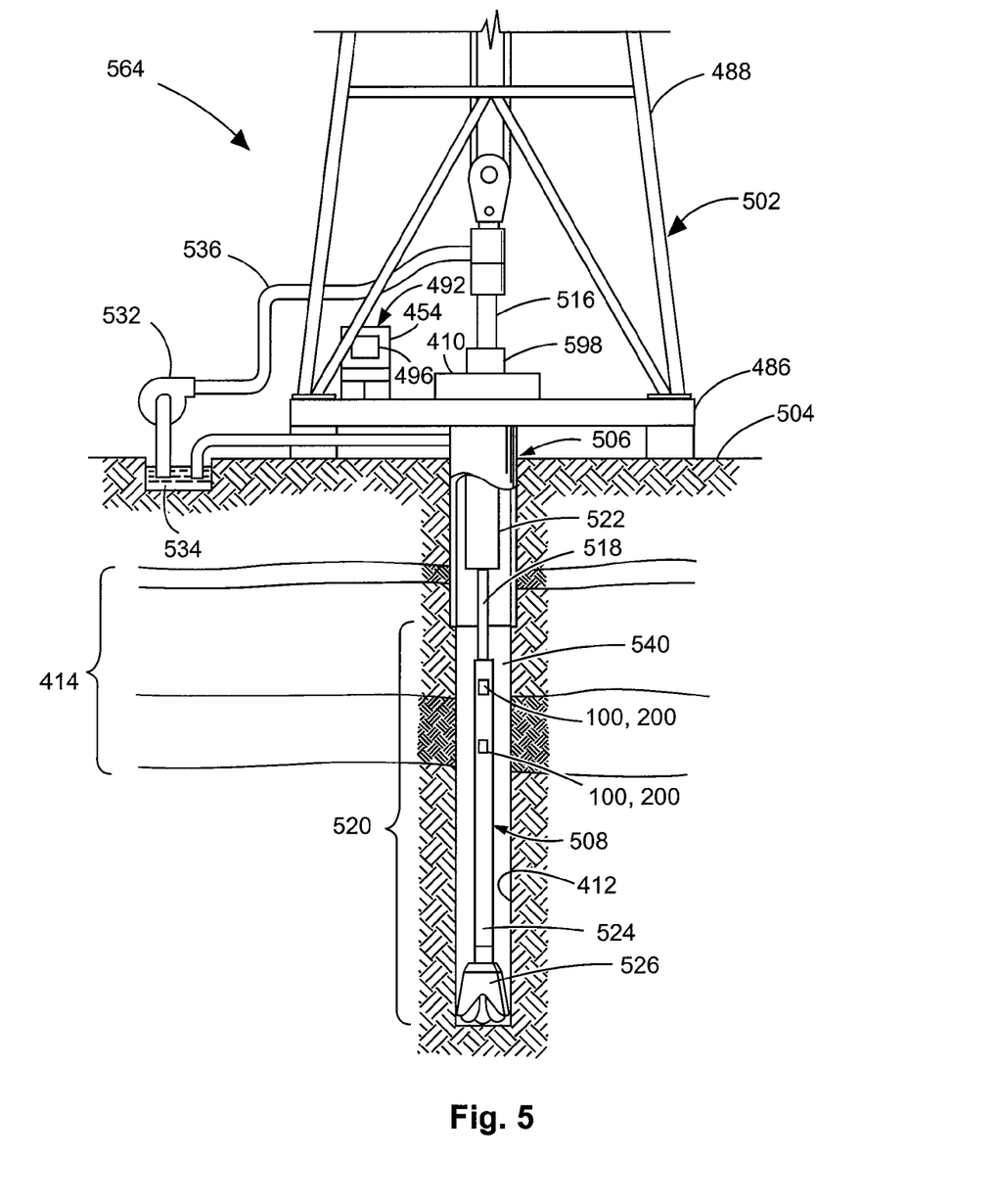
FIG. 5 illustrates a drilling rig system embodiment of the invention.

FIG. 4 illustrates a wireline system 464 embodiment of the invention, and FIG. 5 illustrates a drilling rig system 564 embodiment of the invention. Thus, the systems 464, 564 may comprise portions of a wireline logging tool body 470 as part of a wireline logging operation, or of a down hole tool 524 as part of a down hole drilling operation.

Returning now to FIG. 4, it can be seen that a well is shown during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths the instruments (e.g., the apparatus 100, 200 or system 346 shown in FIGS. 1-3) included in the tool body 470 may be used to perform measurements on the subsurface geological formations 414 adjacent the borehole 412 (and the tool body 470). The measurement data can be communicated to a surface logging facility 492 for storage, processing, and analysis. The logging facility 492 may be provided with electronic equipment for various types of signal processing, which may be implemented by any one or more of the components of the apparatus 100, 200 or system 346 in FIGS. 1-3. Similar formation evaluation data may be gathered and analyzed during drilling operations (e.g., during logging while drilling (LWD) operations, and by extension, sampling while drilling).

In some embodiments, the tool body 470 comprises an acoustic tool for generating acoustic noise, and obtaining/analyzing acoustic noise measurements from a subterranean formation through a borehole. The tool is suspended in the wellbore by a wireline cable (e.g., wireline cable 474) that connects the tool to a surface control unit (e.g., comprising a workstation 454). The tool may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including measurement while drilling (MWD) tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412.

The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1-5, it may be seen that in some embodiments, the systems 364, 464, 564 may include a drill collar 522, a down hole tool 524, and/or a wireline logging tool body 470 to house one or more apparatus 100, 200 similar to or identical to the apparatus 100, 200 described above and illustrated in FIGS. 1-3. Components of the system 364 in FIG. 3 may also be housed by the tool 524 or the tool body 470.

Thus, for the purposes of this document, the term "housing" may include any one or more of a drill collar 522, a down hole tool 524, or a wireline logging tool body 470 (all having an outer wall, to enclose or attach to instrumentation, acoustic sources, sensors, fluid sampling devices, pressure measurement devices, transmitters, receivers, acquisition and processing logic, and data acquisition systems). The tool 524 may comprise a down hole tool, such as an LWD tool or MWD tool. As noted previously, the wireline tool body 470 may comprise a wireline logging tool, including a probe or sonde, for example, coupled to a logging cable 474. Many embodiments may thus be realized.

For example, in some embodiments, a system 464, 564 may include a display 496 to present acoustic noise information, both measured and processed/calculated, as well as database information, perhaps in graphic form. A system 464, 564 may also include computation logic, perhaps as part of a surface logging facility 492, or a computer workstation 454, to receive signals from transmitters and receivers, and other instrumentation to determine properties of the formation 414.

Thus, a system 364, 464, 564 may comprise a tubular housing 302, such as a down hole tool body, including a wireline logging tool body 470 or a down hole tool 524 (e.g., an LWD or MWD tool body), and an apparatus 100, 200 attached to the tubular housing 302, the apparatus 100, 200 to be constructed and operated as described previously.

In some embodiments, a driving motor may be attached to the interior of the housing. Thus, the system 364, 464, 564 may comprise a motor that is disposed within and attached to the tubular housing 302.

In some embodiments, the housing may be used to constrain the movement of the driven member. Thus, the tubular housing 302 may be slideably coupled to the driven member 120.

In some embodiments, the housing has opposing membranes, to couple the generated acoustic wave to fluid in the borehole. Thus, the tubular housing 302 may comprise comprise a pair of substantially opposed membranes 148 intersecting a reciprocating axis (e.g., axis O) of the driven member 120.

In some embodiments, the longitudinal axis of the housing and the driving member axis of rotation may parallel each other, and in some embodiments, they are also substantially coincident (e.g., see FIGS. 1-2). Thus, the longitudinal axis of the tubular housing 302 may be substantially parallel to the axis of rotation R of the driving member 110.

In some embodiments, the housing may use one or more cutout windows, optionally covered with a membrane, to permit propagation of the generated acoustic wave. Thus, the tubular housing 302 may have two or more cutout windows 152 located proximate to the driven member 120.

In some embodiments, the movement of the driven member can be constrained to one or two axes. Thus, the tubular housing 302 may be slideably coupled to the driven member 120 along two substantially perpendicular axes (e.g., the axes of motion associated with the motion guides 156 shown in FIG. 2).

In some embodiments, the housing may take the form of a wireline tool body, or an MWD/LWD tool. Thus, the tubular housing 302 may comprise one of a wireline tool body, an MWD down hole tool, or an LWD down hole tool.

The apparatus 100, 200; tool body 104; driving member 110; driving lobe 114; driven member 120; cam 124; orifices 132; restoration devices 136; shafts 138, 162; motor 140; transmission 144; membrane 148; containment body 150; cutouts 152; motion guides 156; bearing seals 158; housing 302; transceiver 324; processors 330; workstation 356; systems 364, 464, 564; surface 366; rotary table 410; borehole 412; computer workstations 454; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; and hose 536 may all be characterized as "modules" herein.

Such modules may include hardware circuitry, and/or a processor and/or memory circuits, software program modules and objects, and/or firmware, and combinations thereof, as desired by the architect of the apparatus 100, 200 and systems 364, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100, 200 and systems 364, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as subcomponents within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
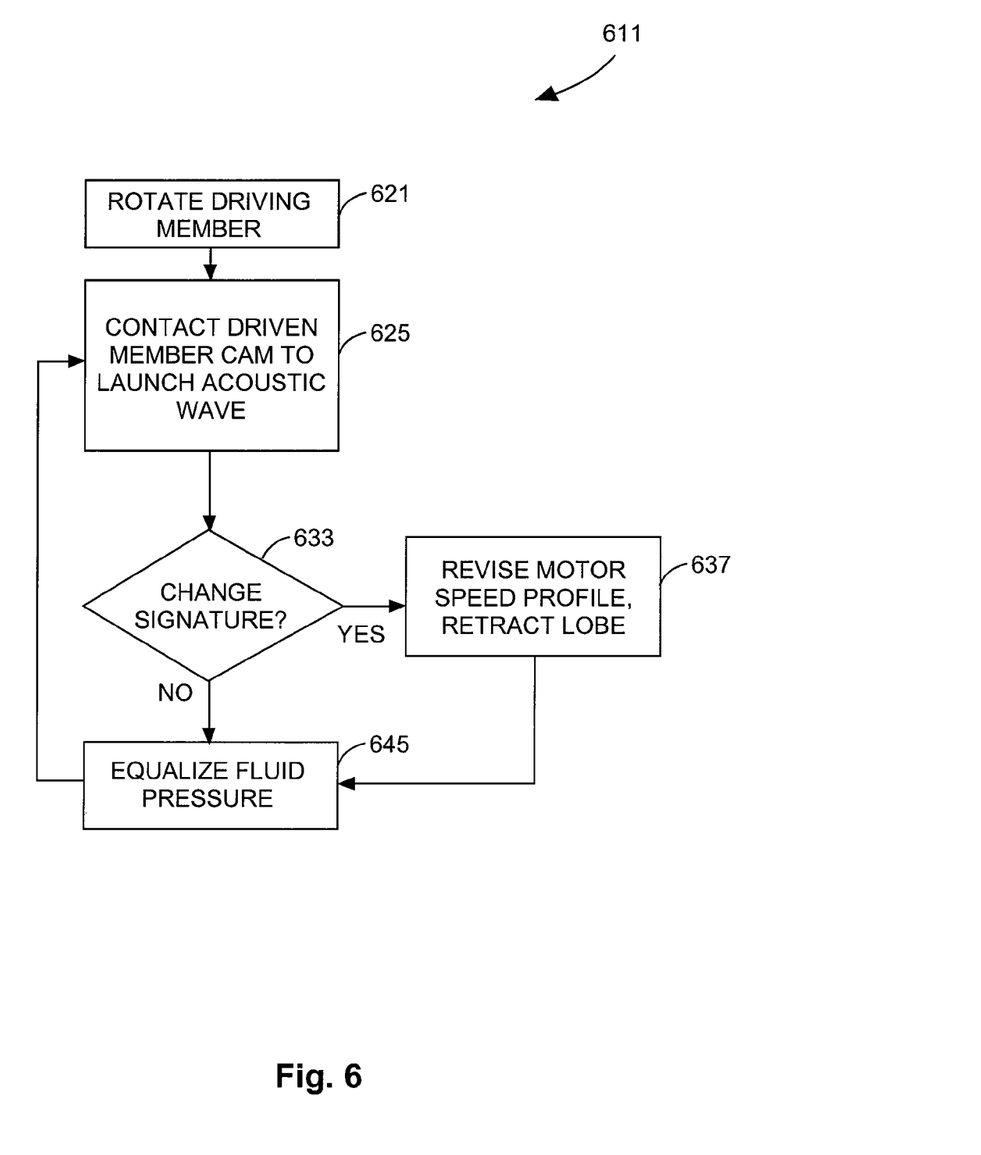
FIG. 6 is a flow chart illustrating several methods according to various embodiments of the invention.

For example, FIG. 6 is a flow chart illustrating several methods 611 according to various embodiments of the invention. In some embodiments, the methods 611 may include rotating a driving member with a driving lobe to contact a cam on a driven member, to launch an acoustic wave, including a dipole acoustic wave.

Thus, a method 611 may begin at block 621 with rotating a rotatable driving member having at least one driving lobe.

The method 611 may continue on to block 625 with periodically contacting at least one cam on a unitary driven member with the at least one driving lobe during rotation of the rotatable driving member to set the driven member in motion to launch an acoustic wave. The wave may be launched along an axis substantially orthogonal to the axis of rotation of the driving member, where the driving member is disposed completely within the driven member, and the acoustic wave has a signature at least partially determined by a profile of the cam and a rotation rate of the driving member.

The driven member may have two cams that are located so that the acoustic wave emanates from a dipole source. Thus, the activity at block 625 may comprise contacting a pair of cams on the driven member so that the acoustic wave is launched from a dipole acoustic source.

The driven member may have two cams that are located so that the acoustic wave emanates from a pair of dipole sources. Thus, the activity at block 625 may comprise contacting a pair of cams on the driven member so that the acoustic wave is launched from a co-located pair of approximately orthogonal dipole acoustic sources.

A motor can be used to drive the driving member, so that the speed profile of the motor and a cam surface profile interact to further determine the signature, and therefore the frequency spectrum of the acoustic wave. In this way, the lobe surface profile and the cam surface profile cooperate to determine at least a portion of the acoustic wave signature.

The speed of the motor rotating the driving member can be controlled to adjust the acoustic signature. Thus, if it is desired to change the signature at block 633, the method 611 may comprise, at block 637, rotating the rotatable driving member so that the rotational speed of a motor is controlled (and revised) as a function of shaft rotation angle measured between a reference point on the shaft of the motor and a fixed reference on the stator or housing of the motor, wherein the motor is coupled to the driving member.

The driving lobes or cams may be retractable, perhaps using an electrical solenoid or other actuator. Thus, the activity at block 637 may comprise retracting the driving lobe(s) or the cam(s) to prevent contact between the driving lobe and the cam during some portion of a time period during which the rotating (of the driving member) occurs.

One or more membranes may be used to couple the driven member to fluid in the borehole, and fluid pressure on the member may be equalized with a piston in the down hole tool, or another arrangement. Thus, the method 611 may continue on to block 645 to include equalizing fluid pressure upon a membrane fluidly coupled to the driven member and a borehole.

It should be noted that the methods described herein do not have to be executed in the order described, or in any particular order. Moreover, various activities described with respect to the methods identified herein can be executed in iterative, serial, or parallel fashion. The various elements of each method can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In some embodiments, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
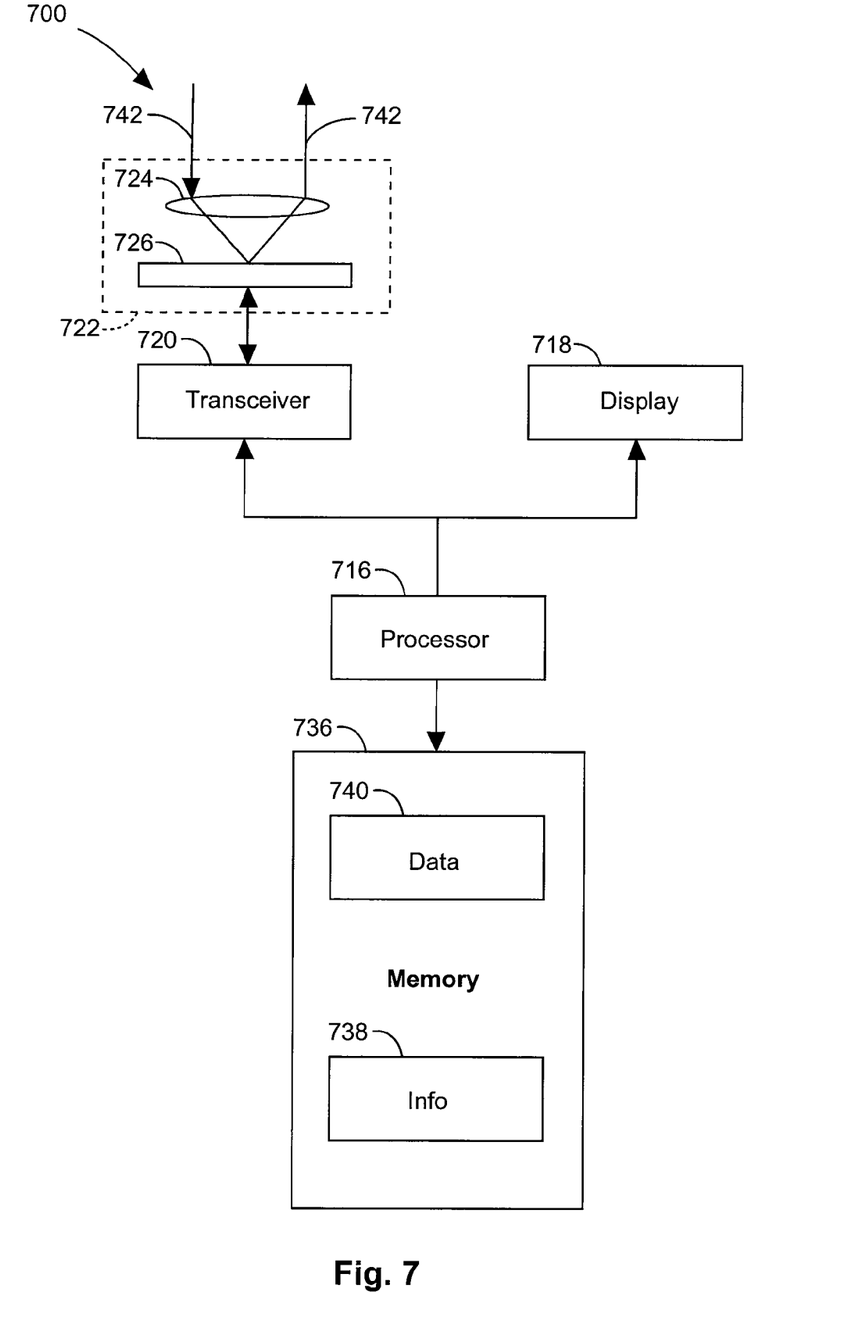
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any of the actions described with respect to the methods of FIG. 6, the apparatus of FIGS. 1-2, and the systems of FIGS. 3-5. The processors 716 may comprise one or more processors sold by Intel Corporation (e.g., Intel® Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antennas 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100, 200 shown in FIGS. 1-2. In some embodiments, the article 700 is similar to or identical to the apparatus 100, 200 or systems 346, 446, 546 shown in FIGS. 3-5.

Figure 8:
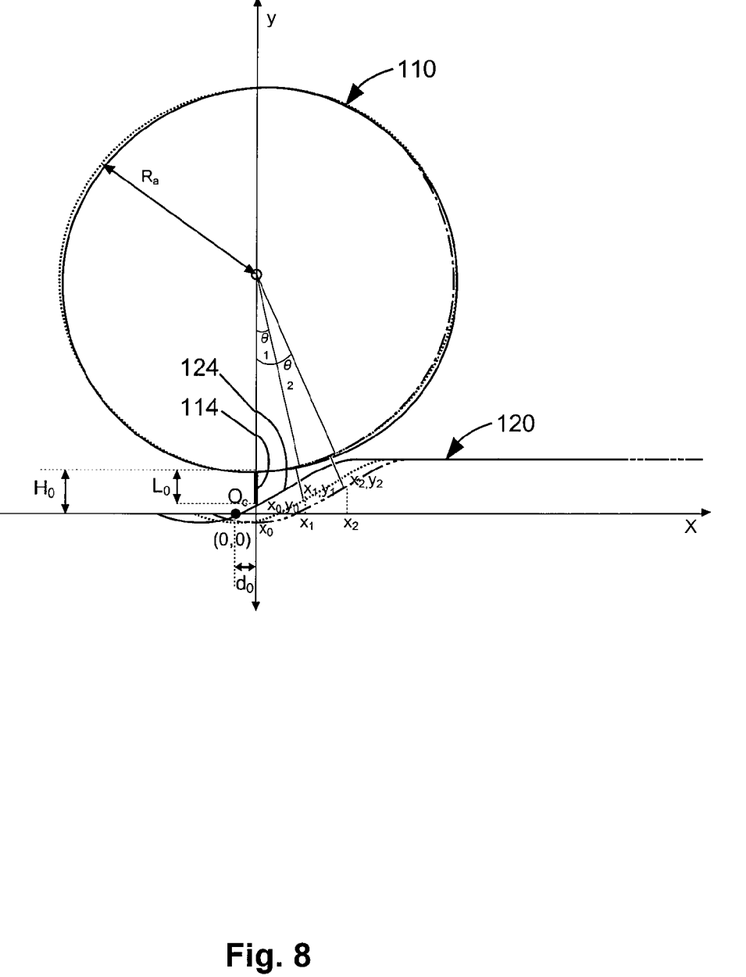
FIG. 8 illustrates the interaction between a driving member and the surface of a cam on a driven member, as shown in FIG. 1, according to various embodiments of the invention.

FIG. 8 illustrates the interaction between a driving member 110 and the surface of a cam 124 on a driven member 120, as shown in FIG. 1, according to various embodiments of the invention.

Displacement of the driven member 120 can be related to the rotation angle θ of the driving member 110. Coupled with equations governing the rotation of the driving member 110, the shape of the cam 124 can be designed to produce a desired excitation pulse. The equations relating the displacement to the rotation angle are as follows:

$$x_a = R_a * \cos(\omega t); \text{ and}$$

$$y_a = (R_a + H_0) - (R_a + L_0) * \cos(\omega t); \text{ where}$$

$y_c = f(x_c)$, the function f describes the shape of the cam's surface.

At each instant of time t, where the tip of the driving lobe 114 on the driving member 110 touches the cam surface, $y_a(t)=y_c(t)$. Thus, at $t_0$ we find $x_0$ and $y_0$ (in this case $x_0=d_0$), and at $t_1$ (corresponding to $\theta_1$) we find $y_1=(R_a+H_0)-(R_a+L_0)*\cos(\omega t_1)$. Knowing $y_1$ leads to knowing $x_1$, as $x_1=f^{-1}(y_1)$. The displacement of the driven member 120 between $t_0$ and $t_1$ is the same as the difference $x_1-x_0$. Extending this reasoning, the movement of the driven member 120 can be fully characterized.

Therefore, finding $x_c(t)$ that corresponds to $y_c(t)$ permits determining the displacement of the driven member 120, and consequently the resulting change in volume determined by movement of the driven member 120 within the containment body 150. Assuming that the driven member 120 moves inside a chamber (e.g., the containment body 150) filled with a fluid of known finite compressibility, the resulting changes in membrane pressure can be derived relative to time and frequency.

The shape of the surface of the cam 124 defines the pressure waveform spectrum behavior. The shape can thus be changed to achieve the desired characteristics of the pressure waveform. Extending this concept, the design may also be adapted so that the radius of the tip of the driving lobe 114 is a function of the angle $\theta$.

A constant angular speed profile, i.e., $\theta(t)=\omega t$ for the cam 124 can be used. Variable angular speed profiles can be designed and implemented to influence the movement of the driven member 120 as well.

For example, the speed of the motor 140 used to move the driving member 110 can be controlled as a function of the rotor's angular position by using a resolver to provide position feedback. An input voltage driving the motor can be set as a function of the rotor position to control its rotational speed. A motor axis speed control can also be useful for determining the length of the dead time intervals during which the driven member 120 stands still (without actively being contacted to move). Control of a pressure wave profile can also be used to reduce the amplitude of possible tool modes by lowering the acoustic energy output at certain spectral regions where the tool assembly ## may be more prone to resonate.

Figure 9:
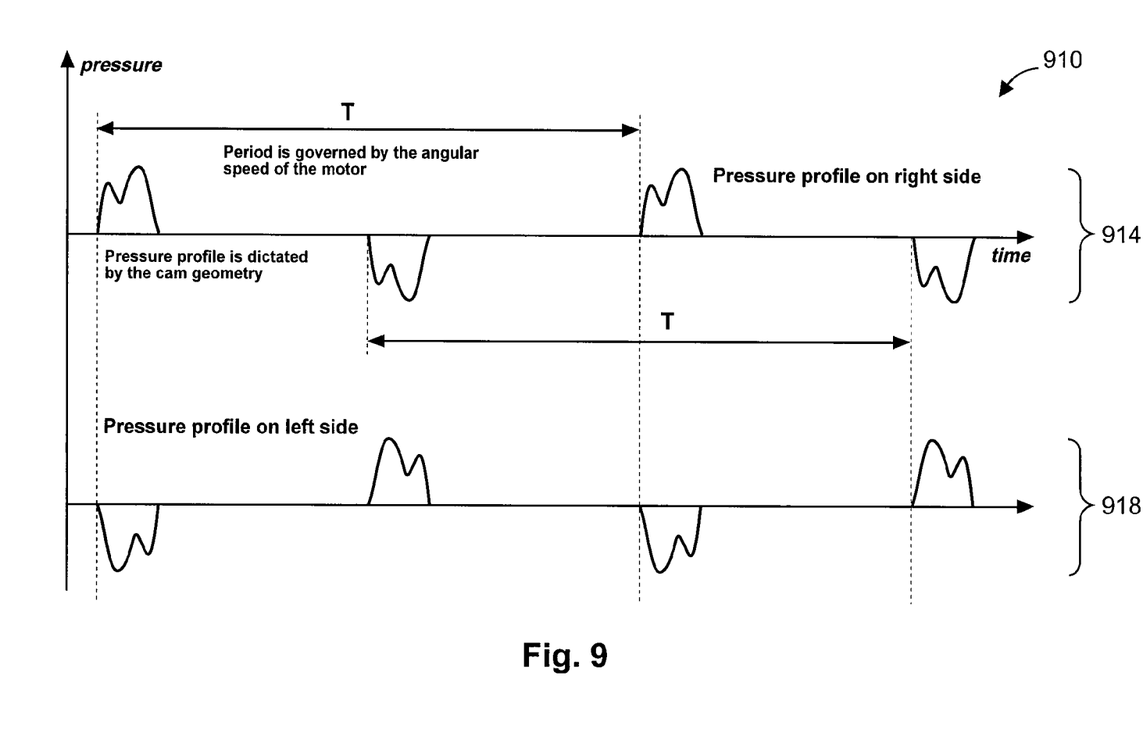
FIG. 9 illustrates potential pressure profiles for the single dipole source of FIG. 1, according to various embodiments of the invention.

FIG. 9 illustrates potential pressure profiles 910 for the single dipole source of FIG. 1, according to various embodiments of the invention. Here the pressure profiles 910 of the first side 914 (e.g., right side) of the source apparatus 100, and the second side 918 (e.g., left side) of the source apparatus 100, respectively, are shown with respect to time T.

Different shapes of the cam 124 can be used to generate a variety of acoustic wave shapes defined by the pressure profiles 910. For example, a sharply peaked cam 124 can provide an impulse-type response. A peak height on the cam 124, followed by a gradually decaying cam height can provide a correspondingly decayed wave shape. Similar, a peak preceded by a gradually rising cam height can provide a corresponding decayed maximum displacement. Peak cam heights, preceded or followed by lower heights that are more gradually approached and left behind by the driving lobe 114 can provide both high and low frequency acoustic waveforms, whereas an isolated peak on the cam 124 preceded by or followed by several closely spaced neighboring peaks can provide a chirp waveform. Other variations are possible.

In summary, using the apparatus, systems, and methods disclosed herein may provide the ability to produce powerful acoustic waves with greater efficiency and a tailored, multipole acoustic waveform. This type of operation can significantly enhance the value of services provided by an operation and exploration company, delivering more consistent and energetic acoustic signal performance for better formation characterization.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
    a rotatable driving member having at least one driving lobe; and
    a unitary driven member having at least one cam, the driving member disposed completely within the driven member, wherein the driven member is configured to be set in motion to launch an acoustic wave along an axis substantially orthogonal to an axis of rotation of the driving member when the driving member rotates to periodically contact the at least one cam with the at least one driving lobe, the acoustic wave having a signature determined by a profile of the cam and a rotation rate of the driving member.

2. The apparatus of claim 1, wherein the driven member is constrained to move along an axis substantially perpendicular to the axis of rotation of the driving member.

3. The apparatus of claim 1, wherein the driven member comprises a fluid-filled, substantially closed body with at least one pressure-equalizing orifice.

4. The apparatus of claim 1, wherein the driven member, when set in motion, comprises a reciprocating body having two substantially opposing cams.

5. The apparatus of claim 1, wherein the driven member is coupled to at least one restoration device to limit a travel distance of the driven member, and to return the driven member to a rest position.

6. The apparatus of claim 1, wherein the driven member comprises a first substantially cylindrical body, wherein the rotatable driving member comprises a second substantially cylindrical body, and wherein longitudinal axes of the first and second substantially cylindrical bodies are substantially coaxial along the same longitudinal axis.

7. The apparatus of claim 1, further comprising:
a motor having a shaft coupled to the driving member, the shaft substantially parallel to the axis of rotation of the driving member.

8. The apparatus of claim 1, wherein the at least one driving lobe comprises a pair of driving lobes, and wherein the at least one cam comprises a pair of cams, the driving lobes having a first pair of mirrored profiles, and the pair of cams having a second pair of mirrored profiles.

9. The apparatus of claim 1, further comprising:
a transmission to couple a motor to the driving member.

10. The apparatus of claim 1, further comprising:
a motor having a shaft coupled to the driving member, the shaft being non-parallel to the axis of rotation of the driving member.

11. The apparatus of claim 1, wherein the driven member comprises a first substantially cylindrical body, wherein the rotatable driving member comprises a second substantially cylindrical body, and wherein longitudinal axes of the first and second substantially cylindrical bodies are approximately orthogonal.

12. A system, comprising:
a tubular housing; and
an apparatus comprising a motor having a shaft disposed within the tubular housing, a rotatable driving member having at least one driving lobe, the driving member coupled to the shaft, and a unitary driven member having at least one cam, the driving member disposed completely within the driven member, wherein the driven member is configured to be set in motion to launch an acoustic wave along an axis substantially orthogonal to an axis of rotation of the driving member when the driving member rotates to periodically contact the at least one cam with the at least one driving lobe, the acoustic wave having a signature determined by a profile of the cam and a rotation rate of the driving member.

13. The system of claim 12, wherein a housing of the motor is disposed within and attached to the tubular housing.

14. The system of claim 12, wherein the tubular housing is slideably coupled to the driven member.

15. The system of claim 12, wherein the tubular housing comprises:
a pair of substantially opposed membranes intersecting a reciprocating axis of the driven member.

16. The system of claim 12, wherein a longitudinal axis of the tubular housing is substantially parallel to the axis of rotation of the driving member.

17. The system of claim 12, wherein the tubular housing has at least two cutout windows proximate to the driven member.

18. The system of claim 12, wherein the tubular housing is slideably coupled to the driven member along two substantially perpendicular axes.

19. The system of claim 12, wherein the tubular housing comprises:
one of a wireline tool body, a measurement while drilling down hole tool, or a logging while drilling down hole tool.

20. A method, comprising:
rotating a rotatable driving member having at least one driving lobe; and
during rotation of the rotatable driving member, periodically contacting at least one cam on a unitary driven member with the at least one driving lobe to set the driven member in motion to launch an acoustic wave along an axis substantially orthogonal to an axis of rotation of the driving member, the driving member disposed completely within the driven member, and the acoustic wave having a signature at least partially determined by a profile of the cam and a rotation rate of the driving member.

21. The method of claim 20, wherein the contacting comprises:
contacting a pair of cams on the driven member so that the acoustic wave is launched from a dipole acoustic source.

22. The method of claim 20, wherein the contacting comprises:
contacting a pair of cams on the driven member so that the acoustic wave is launched from a co-located pair of approximately orthogonal dipole acoustic sources.

23. The method of claim 20, wherein the rotating comprises:
controlling rotational speed of a motor as a function of shaft rotation angle measured between a reference point on a shaft of the motor and a fixed reference on a stator of the motor, wherein the motor is coupled to the driving member.

24. The method of claim 20, wherein contacting the at least one cam on the unitary driven member with the at least one driving lobe is accomplished using a cam follower.

25. The method of claim 20, wherein a lobe surface profile and a cam surface profile cooperate to determine a portion of the signature.

26. The method of claim 20, further comprising:
retracting the driving lobe or the at least one cam to prevent contact between the driving lobe and the at least one cam during some portion of a time period during which the rotating occurs.

27. The method of claim 20, further comprising:
equalizing fluid pressure upon a membrane fluidly coupled to the driven member and a borehole.

* * * * *